United States Patent [19]

Costemalle et al.

[11] Patent Number: 5,246,778

[45] Date of Patent: Sep. 21, 1993

[54] HOSE COMPOSITION

[75] Inventors: Bernard J. Costemalle, Rhode-St-Genese, Belgium; Robert C. Keller, Morris Plains, N.J.; Donald F. Kruse, West New York, N.J.; James V. Fusco, Red Bank, N.J.; Marcel A. Steurs, Boortmeerbeek, Belgium

[73] Assignee: Exxon Chemical Patents Inc., Linden, N.J.

[21] Appl. No.: 931,236

[22] Filed: Aug. 17, 1992

Related U.S. Application Data

[63] Continuation-in-part of Ser. No. 522,553, May 14, 1990.

[51] Int. Cl.$^5$ .............................................. D02G 3/00
[52] U.S. Cl. ................................... 428/398; 138/141; 524/576; 524/577; 525/333.4; 525/356
[58] Field of Search ..................... 138/141; 418/398

[56] References Cited

U.S. PATENT DOCUMENTS

| | | | |
|---|---|---|---|
| 3,567,680 | 3/1971 | Iannicelli | 528/575.5 |
| 4,096,888 | 6/1978 | Stefano et al. | 138/125 |
| 4,158,033 | 6/1979 | Stefano et al. | 264/103 |
| 4,698,890 | 10/1987 | Neaves | 29/412 |

FOREIGN PATENT DOCUMENTS 0344021 11/1989 European Pat. Off. .

*Primary Examiner*—Bernard Lipman
*Attorney, Agent, or Firm*—M. L. Gibbons; J. E. Schneider

[57] ABSTRACT

A hose composition is provided which comprises a halogen-containing copolymer of a $C_4$ to $C_7$ isomonoolefin and a para-alkylstyrene, fillers, rubber compounding additives and a curing agent. A hose comprising at least a portion made from this hose composition is also provided.

13 Claims, No Drawings

HOSE COMPOSITION

This is a Continuation-In-Part of U.S. patent application Ser. No. 522,553, filed May 14, 1990.

BACKGROUND OF THE INVENTION

1. Field of the Invention

The present invention relates to a composition suitable for use in hoses, including automotive radiator coolant hoses, air conditioning hoses and steam hoses; and hoses comprising the composition.

2. Description of Information Disclosures

Hoses made from synthethic or natural rubbers and methods for producing the hoses are known. Hoses used to conduct fluids to and from automotive radiators are described, for example, in U.S. Pat. No. 4,096,888; U.S. Pat. No. 4,698,890; and U.S. Pat. No. 4,158,033, the teachings of which are hereby incorporated by reference.

Although there are many commercially available types of automotive radiator hoses, there is still a need to improve the properties of these hoses, such as resistance to water or coolant diffusion, heat resistance and compression set.

Rubber based steam hoses are also well known in the art. One problem with such hoses is that moisture often permeates the rubber portion of the hose. When the moisture is cooled and then reheated, the trapped moisture can cause the formation of blisters or partial blowouts. This effect is known as "popcorning".

Because of its good impermeabilities, halogenated butyl rubber has been used for steam hoses in an effort to reduce this popcorning effect. There exists, however, a continuing need for hose compositions with improved impermeability and heat reistance.

It has now been found that hoses that are made from a composition comprising certain halogen-containing copolymers of a $C_4$ to $C_7$ isomonoolefin and a para-alkylstyrene containing a critical amount of the para-alkylstyrene moiety and a critical amount of chemically bound halogen have improved properties.

SUMMARY OF THE INVENTION

In accordance with the invention, there is provided a hose composition comprising: (1) a halogen-containing copolymer of a $C_4$ to $C_7$ isomonoolefin and a para-alkylstyrene, said copolymer comprising at least about 5 weight percent of said para-alkylstyrene, and at least about 0.4 mole percent of said halogen; (2) a component selected from the group consisting of a filler, a rubber compounding additive and mixtures thereof; and (3) a curing agent.

In accordance with the invention, there is also provided a vulcanized elastomeric hose comprising an inner tube, a reinforcing member and an outer cover, wherein at least a portion of said hose comprises a composition comprising: (1) a halogen-containing copolymer of a $C_4$ to $C_7$ isomonoolefin and a para-alkylstyrene, said copolymer comprising at least about 5 weight percent of said para-alkylstyrene, and at least about 0.4 mole percent of said halogen; and (2) a component selected from the group consisting of a filler, a rubber compounding additive and mixtures thereof. For steam hose applications the copolymer should preferably contain at least about 0.5 mole percent of said halogen.

DETAILED DESCRIPTION OF THE INVENTION

The hose composition of the present invention comprises a halogen-containing copolymer of a $C_4$ to $C_7$ isomonoolefin and a para-alkylstyrene, fillers, rubber compounding additives and a curing agent with or without curing agent accelerators.

Suitable halogen-containing copolymers of a $C_4$ to $C_7$ isomonoolefin and a para-alkylstyrene for use as a component of the present hose composition comprise at least 5 weight percent of the para-alkylstyrene moiety. The para-alkylstyrene moiety may range from about 5 weight percent to about 20 weight percent of the copolymer. Furthermore, the suitable copolymers comprise at least about 0.4 mole percent, preferably at least about 0.5 mole percent of the halogen. The halogen content of the copolymer may range from about 0.4 to about 1.0 mole percent. The halogen may be bromine, chlorine, and mixtures thereof. Preferably, the halogen is bromine. The major portion of the halogen is chemically bound to the para-alkyl group, that is, the halogen-containing copolymer comprises para-halo alkyl groups.

The copolymers of the isomonoolefin and para-alkylstyrene useful to prepare the halogen-containing copolymers suitable as component of the hose composition of the present invention include copolymers of isomonoolefin having from 4 to 7 carbon atoms and a para-alkylstyrene, such as those described in European patent application 89305395.9 filed May 26, 1989, (Publication No. 034402published Nov. 29, 1989). The preferred isomonoolefin comprises isobutylene. The preferred para-alkylstyrene comprises para-methylstyrene. Suitable copolymers of an isomonoolefin and a para-alkylstyrene include copolymers having a number average molecular weight ($\overline{Mn}$) of at least about 25,000, preferably at least about 30,000, more preferably at least about 100,000. The copolymers also, preferably, have a ratio of weight average molecular weight ($\overline{Mw}$) to number average molecular weight ($\overline{Mn}$), i.e., $\overline{Mw}/\overline{Mn}$ of less than about 6, preferably less than about 4, more preferably less than about 2.5, most preferably less than about 2. The brominated copolymer of the isoolefin and para-alkylstyrene by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range Of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

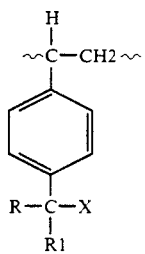

in which R and R$^1$ are independently selected from the group consisting of hydrogen, alkyl preferably having from 1 to 5 carbon atoms, primary alkyl halides, secondary alkyl halides preferably having from to 5 carbon atoms, and mixtures thereof and X is selected from the group consisting of bromine, chlorine and mixtures thereof, such as those disclosed in European patent application 8930595.9 filed May 26, 1989, (Publication No. 0344021 published Nov. 29, 1989).

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40° to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene, chloride, chloroform, carbon tetrachloride, methyl chloride, with methyl chloride being particularly preferred.

An important element in producing the copolymer is the exclusion of impurities from the polymerization reactor, namely, impurities which, if present, will result in complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, metal-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.001 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons (C$_4$ to C$_7$) and halogenated hydrocarbons. Since the high boiling point para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

With halogenation of para-methylstyrene/isobutylene copolymers, it is possible to halogenate the ring carbons, but the products are rather inert and of little interest. However, it is possible to introduce halogen desired functionality into the para-methylstyrene/isobutylene copolymers hereof in high yields and under practical conditions without obtaining excessive polymer breakdown, cross-linking or other undesirable side reactions.

It should be noted that radical bromination of the enchained para-methyl styryl moiety in the useful copolymers for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer hydrogenation temperatures) as promoters of radical halogenation, to yield almost exclusively the desired benzylic bromine functionality, via substitution on the para-methyl group, and without appreciable chain *scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and percent by weight on the copolymer, preferably between about 0.02 and 0.3 percent. The preferred initiators are bis azo compounds, such as azo bis isobutyronitrile (AIBN), azo bis (2,4 dimethyl valero) nitrile, azo bis (2 methyl butyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of the copolymers of para-methylstyrene and isobutylene is highly selective, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful in the present invention is preferably accomplished by halogenating an isobutylene-para-methylstyrene copolymer using bromine in a normal alkane (e.g., hexane or heptane) solution utilizing a bis azo initiator, (e.g., AIBM or VAZO ® 52: 2,2'-azobis(2,4-dimethylpentane nitrile), at about 55° to 80° C., for a time period ranging from about 4.5 to about 30 minutes, followed by a caustic quench. The recovered polymer is washed in basic water wash and water/isopropanol washes, recovered, stabilized and dried.

The aromatic halomethyl groups permit facile cross-linking to be accomplished in a variety of ways, for example, either directly through the halomethyl group or by conversion to other functional groups to permit the desired cross-linking reactions to be employed. Direct cross-linking can be effected with a variety of polyfunctional nucleophilic reagents such as ammonia, amines, or polyamines; metal dicarboxylates; metal dithiolates; promoted metal oxides (i.e., ZnO +dithiocarbamates), etc. Cross-linking can also be effected via polyalkylation reactions. The aromatic halomethyl groups, thus, provide a wide choice of cross-linking reactions to be used.

One of the advantages of a isobutylene/para-methylstyrene copolymer incorporating phenyl rings (and no backbone unsaturation) is that greatly enhanced ozone resistance is achieved.

The hose composition of the present invention also comprises a component selected from the group consisting of a filler, a rubber compounding additive and mixtures thereof.

The filler may be a non-reinforcing filler, a reinforcing filler, an organic filler, and an inorganic filler, and mixtures thereof.

Suitable fillers include calcium carbonate, clay, silica, talc, carbon black and mixtures thereof.

Suitable rubber compounding additives include antioxidants, stabilizers, rubber processing oils, pigments and mixtures thereof. The rubber process oils may be paraffinic or naphthenic process oils. Suitable antioxidants include hindered phenols, amino phenols, hydroquinones, alkyldiamines, amine condensation products and the like. The preferred additives are fatty acids, low molecular weight polyethylene, waxes, and mixtures thereof. A preferred fatty acid is stearic acid. Mixtures of other fatty acids can be used with the stearic acid.

The hose composition also comprises a curing agent. Any known curative system suitable for vulcanization of rubber may be used.

Suitable curing agents include peroxide cures, sulfur cures and non-sulfur cures. For example, the curing agent may be zinc oxide. Optionally, curing agent accelerators may be used such as dithiocarbamates, thiurams, thioureas, and mixtures thereof, zinc oxide-free cures may also be used such as, for example, litharge; 2-mercaptoimidazoline; diphenyl guanidine; 2-mercaptobenzimidazole; and N,N'-phenylene-bismaleimide.

Resin curatives may also be used as curative component of the hose composition, such as, phenolic resins, brominated phenolic resins, urethane resin, etc. organic peroxides may be used as curing agents, such as, for example, dicumyl peroxide, benzoyl peroxide, $\alpha, \alpha'$-Bis(tertiary butyl peroxy) diisopropyl benzene, and the like.

The hose composition of the present invention may comprise the specified halogen-containing copolymer of a $C_4$ to $C_7$ isomonoolefin and a para-alkylstyrene in an amount ranging from about 35 to 65, preferably from about 45 to about 55 weight percent, the total amount of fillers and additives in an amount ranging from about 35 to 65, preferably from about 45 to 55 weight percent, and the curing agent in an amount ranging from about 0.5 to 5.0, preferably from about 1.5 to 3.0 weight percent, all said percentages being based on the weight of the total hose composition.

The hose composition may be vulcanized by subjecting it to heat and/or light or radiation according to any conventional vulcanization process. Typically, the vulcanization is conducted at a temperature ranging from about 130° C. to about 250° C., preferably from about 150° C. to about 200° C., for a time period ranging from about 1 to about 150 minutes.

The hose composition of the present invention may be used in the production of any type of hoses, for example, automotive radiator coolant hose, air conditioning hose, steam hose and the like.

Automotive radiator coolant hoses typically comprise an inner tube and an outer cover and a yarn or fiber reinforcement layer between the tube and cover. Steam hoses and some other types of hoses also use reinforcements and/or other layers between the inner tube and the outer cover. In accordance with the present invention, the hose composition is used to fabricate at least a portion of the hose.

Thus, the hose composition of the present invention may be used to produce the inner tube and/or the outer cover of the hose. Preferably, the hose composition is used to produce at least a portion of the inner tube.

The hose may be produced by any conventional method. For example, the unvulcanized hose composition may be formed into an elongated tube. The tube and reinforcement is then positioned on a mandrel. A cover material may be applied to the outer surface of the tube. Pressure may be applied either directly or by wrapping the hose in a tape fabric, such as a plastic tape, and, thereafter, subjecting the hose to heat and steam pressure to vulcanize the hose.

A typical hose generally comprises an inner tube, an outer cover and a reinforcement. The inner tube is adapted to contain the fluid or vapor to be conveyed by the hose and to resist the internal pressure of the material being conveyed or the external forces acting on the hose. The cover protects the hose from mechanical and environmental damage.

A preferred method of manufacturing hoses, such as automotive hoses, is the extrusion process. For example, to produce a hose utilizing the hose composition of the present invention by the extrusion process, the hose composition is heated in an extruder suitable for extruding rubber. The extruder acts like a pump, thereby forcing the softened rubber mass through a pin and ring die configuration which causes the composition to take the shape of a tube. The tube is cooled immediately in a water trough. Subsequently, the reinforcement is applied either by spiralling, knitting, or braiding a textile yarn around the tube. Thereafter, the reinforced tube is covered with the hose composition of the present invention or with a different composition, such as compositions conventionally used in outer tube covers, depending on the desired end usage of the hose, by passing the reinforced tube through a cross-head extruder. The resulting extruded, covered and reinforced tube is cooled again in a water trough, then cut into hose pieces of desired lengths which are placed on preformed mandrels. Thereafter, the hose pieces are vulcanized in a steam autoclave.

For steam hose applications, one or more layers of brass-coated steel wire may be used as a reinforcement.

The following examples are presented to illustrate the invention.

EXAMPLES

Experiments were conducted to compare the cure response and physical properties of formulations comprising brominated isobutylene-para-methylstyrene copolymer of the present invention to a formulation comprising a bromobutyl rubber. The brominated isobutylene-para-methylstyrene copolymer used in these formulations contained the bromine in the para-methylstyrene moiety. The master batch formulations to which the brominated isobutylene-paramethylstyrene copolymers were added was the same as the master batch formulation to which the bromobutyl rubber was added. Different curing agents were used in Formulations A through E than in Formulation F, as shown in Table I. The curing agents in Formulations A through E comprised zinc oxide and dipentamethylene thiuram hexasulfide. The curing agents in Formulation F comprised zinc oxide, benzothiazyl disulfide and tetramethylthiuram disulfide. The formulations in accordance with the present invention were designated A through E. The comparative formulation containing bromobutyl rubber was designated F. The bromobutyl rubber used in Formulation F comprised 2 wt. percent bromine and had a Mooney Viscosity of 37 (ML 1+8) at 125° C. (i.e., Exxon Bromobutyl Grade 2233, Exxon Chemical Company).

The bromobutyl rubber used in Formulation F is designated "Copolymer T" in Table I. The bromoisobutylene para-methylstyrene copolymers used in Formulations A though E are designated copolymers Z, Y, X, W and M in Table I. These latter copolymers had different bromine contents and other properties as listed in Table I. All the compounds were cured for 20 minutes at 160° C. in a steam heated compression mold.

The formulations and the results of these tests are shown in Table I.

The Mooney Viscosities in Table I were all measured in accordance with ASTM D1646.

TABLE 1

| Formulation | | A | B | C | D | E | F |
|---|---|---|---|---|---|---|---|
| Copolymer T | | | | | | | 100.0 |
| Copolymer Z | | 100.0 | | | | | |
| Copolymer Y | | | 100.0 | | | | |
| Copolymer X | | | | 100.0 | | | |
| Copolymer W | | | | | 100.0 | | |
| Copolymer M | | | | | | 100.0 | |
| Carbon Black (1) | | 30.0 | 30.0 | 30.0 | 30.0 | 30.0 | 30.0 |
| Carbon Black (2) | | 30.0 | 30.0 | 30.0 | 30.0 | 30.0 | 30.0 |
| Clay (3) | | 20.0 | 20.0 | 20.0 | 20.0 | 20.0 | 20.0 |
| Hydrocarbon oil (4) | | 15.0 | 15.0 | 15.0 | 15.0 | 15.0 | 15.0 |
| Fatty acid mixture | | 3.0 | 3.0 | 3.0 | 3.0 | 3.0 | 3.0 |
| Polyethylene (5) | | 4.0 | 4.0 | 4.0 | 4.0 | 4.0 | 4.0 |
| Stearic Acid | | 2.0 | 2.0 | 2.0 | 2.0 | 2.0 | 2.0 |
| Zinc oxide | | 0.5 | 0.5 | 0.5 | 0.5 | 0.5 | 5.0 |
| MBTS (6) | | | | | | | 2.0 |
| TMTDS (7) | | | | | | | 1.0 |
| DPTHS (8) | | 1.0 | 1.0 | 1.0 | 1.0 | 1.0 | |
| Copolymer Mooney Viscosity, 125° C. | | 59 | 31 | 28.5 | 28.5 | 29 | 37 |
| Para-methylstyrene, wt. % | | 5.0 | 10.0 | 10.5 | 5.0 | 5.0 | — |
| Bromine, mol. % | | 0.5 | 0.8 | 1.2 | 0.6 | 1.4 | 2.0 |
| Mooney Scorch (MS) (9) 132° C. Minutes to 10 Point Rise | | 10.0 | 8.7 | 8.0 | 9.9 | 6.5 | 6.9 |
| Mooney Viscosity (ML) 100° C. 1 + 8 Minute Reading | | 53.9 | 36.6 | 35.1 | 35.6 | 3 | 44.9 |
| Rheometer (10) 160° C. | ML | 12.4 | 6.2 | 6.1 | 6.2 | 7.2 | 9.9 |
| 30 Minute Motor, 1.7 Hz | MH | 43.6 | 46.3 | 45.0 | 35.7 | 49.0 | 26.0 |
| 3 Degree Arc | TS2 | 2.45 | 2.18 | 1.88 | 2.31 | 1.50 | 1.68 |
| 100 Full Scale | T'90 | 12.6 | 13.4 | 14.7 | 12.1 | 17.1 | 3.70 |
| | MH-ML | 31.3 | 40.1 | 38.9 | 29.6 | 41.9 | 16.1 |
| Cure Rate Index | | 12.3 | 10.4 | 8.7 | 11.4 | 8.2 | 64.9 |
| Original Physical Properties (11) | | | | | | | |
| Cure | Hardness, Shore A | 55 | 61 | 63 | 55 | 65 | 57 |
| 20 | 100% Modulus, MPa | 1.59 | 2.28 | 2.95 | 1.26 | 3.87 | 1.04 |
| Min. | 200% Modulus, MPa | 3.83 | 5.30 | 6.48 | 2.93 | 8.27 | 1.97 |
| | Tensile Strength, MPa | 12.65 | 11.35 | 10.89 | 10.43 | 11.09 | 10.34 |
| 160° C. | Elongation, % | 569 | 444 | 345 | 591 | 275 | 780 |
| Tear Strength, Die C (Cure (12) At 25° C. kN/m 20/160 | | 39.27 | 35.48 | 32.16 | 35.46 | 30.98 | 40.93 |
| Aged | Hardness, Shore A | 65 | 73 | 79 | 66 | 79 | 69 |
| 168 | 100% Modulus, MPa | 2.76 | 4.43 | 6.92 | 2.00 | 7.38 | 2.09 |
| Hrs. | 200% Modulus, MPa | 5.96 | 8.96 | 0.00 | 4.03 | 0.00 | 3.32 |
| at | Tensile Strength, MPa | 10.57 | 10.64 | 9.47 | 8.92 | 8.73 | 4.52 |
| 150° C. | Elongation, % | 350 | 238 | 139 | 453 | 120 | 329 |
| Cure | Hardness Change, Pts. | 10 | 12 | 16 | 11 | 14 | 12 |
| 10/160 | Tensile Retained, % | 84 | 94 | 87 | 85 | 79 | 44 |
| | Elongation Retained, % | 61 | 54 | 40 | 77 | 44 | 42 |
| Aged | Hardness, Shore A (13) | 71 | 79 | 85 | 71 | 84 | 65 |
| 168 | 100% Modulus, MPa | 3.06 | 4.81 | 7.06 | 2.13 | | 1.25 |
| Hrs. | 200% Modulus, MPa | 6.12 | 7.50 | | 3.87 | | 1.43 |
| at | Tensile Strength, MPa | 8.55 | 8.80 | 8.12 | 7.04 | 7.21 | 1.48 |
| 165° C. | Elongation, % | 289 | 204 | 122 | 411 | 97 | 255 |
| Cure | Hardness Change, Pts. | 16 | 18 | 22 | 16 | 19 | 8 |
| 20/160 | Tensile Retained, % | 68 | 78 | 75 | 68 | 65 | 14 |
| | Elongation Retained, % | 51 | 46 | 35 | 70 | 35 | 33 |
| Aged | Hardness, Shore A (14) | 52 | 56 | 60 | 50 | 60 | 46 |
| 336 | 100% Modulus, MPa | 1.69 | 2.37 | 3.17 | 1.23 | 3.46 | 1.00 |
| Hrs. | 200% Modulus, MPa | 4.31 | 5.63 | 7.18 | 2.90 | 8.02 | 2.12 |
| at | Tensile Strength, MPa | 12.88 | 11.56 | 10.66 | 10.83 | 9.57 | 10.03 |
| 103° C. | Elongation, % | 520 | 407 | 296 | 557 | 234 | 646 |
| IN 50% COOLANT/H$_2$O, V/V (15) | | | | | | | |
| Cure | Hardness Change, Pts. | −3 | −5 | −3 | −5 | −5 | −11 |
| 20/160 | Tensile Retained, % | 102 | 102 | 98 | 104 | 86 | 97 |
| | Elongation Retained, % | 91 | 92 | 86 | 94 | 85 | 83 |
| | Weight Change, % | 3.46 | 4.02 | 4.48 | 3.58 | 5.01 | 4.96 |
| | Volume Change, % | 2.73 | 3.38 | 3.86 | 3.18 | 4.74 | 4.46 |
| Compression Set, Plied, (16) % 70 Hrs. at 150° C. | | 47.84 | 70.82 | 87.17 | 58.37 | 91.79 | 90.75 |
| Compression Set, % 70 Hrs. at 70° C. + 3 Hrs. at 23° C. Garlock Mold Flow Test | | 34.52 | 45.38 | 55.60 | 41.22 | 63.31 | 76.80 |

TABLE 1-continued

| Formulation | | A | B | C | D | E | F |
|---|---|---|---|---|---|---|---|
| 1500 | UL | 3.70 | 5.95 | 5.65 | 6.50 | 4.50 | 3.30 |
| Psi. | UR | 3.70 | 6.00 | 5.75 | 6.50 | 4.55 | 3.35 |
| 160° C. | LR | 3.65 | 5.80 | 5.60 | 6.40 | 4.40 | 3.30 |
| 5 | LL | 3.65 | 5.85 | 5.60 | 6.40 | 4.40 | 3.35 |
| Min. | Mean | 3.68 | 5.90 | 5.65 | 6.45 | 4.46 | 3.33 |

(1) Carbon black ASTM N326.
(2) Carbon black ASTM N770.
(3) Siloxane-treated clay.
(4) Hydrocarbon oil ASTM type 104B.
(5) Polyethylene, low molecular weight.
(6) MBTS means benzothiazyl disulfide.
(7) TMTDS means tetramethylthiuram disulfide.
(8) DPTHS means dipentamethylene thiuram hexasulfide.
(9) ASTM D 1646.
(10) ASTM D 2084.
(11) ASTM D 412.
(12) ASTM D 624.
(13) ASTM D 573.
(14) ASTM D 471.
(15) Coolant is a commercially available antifreeze mixture, predominantly ethylene glycol, 50% volume of antifreeze per 50% volume of water.
(16) ASTM D 395.

As can be seen from the data of Table I, Formulations A, B, C, D, and E, which were formulations in accordance with the present invention, had a better cure activity than comparative formulation F.

Furthermore, the state of cure as determined by the difference between the maximum torque (MH) and the minimum torque (ML) on the curemeter plot was higher for Formulations A through E. Stress strain properties, including modulus, tensile strength and elongation also indicated that Formulations A through E had an improved state of cure. This is additionally indicated by the compression set results which were generally lower for Formulations A through E of the present invention compared to that of comparative Formulation F. This characteristic is important for maintaining sealability in hoses for conducting fluids. The formulations of the present invention also had significantly better retention of physical properties after being aged in hot air for one week at temperatures of 150° C. to 165° C., respectively.

A second series of experiments were conducted to compare the cure responses and physical properties of formulation comprising brominated isobutylene-paramethylstyrene copolymer of the present invention to a formulation comprising a bromobutyl copolymer typically used in steam hose applications. As with the prior series of experiments the brominated isobutylene-para-methylstyrene copolymer used in the formulations below contained the bromine in the para-methyl styrene moiety. The master batch formulations to which the brominated isobutylene-para-methylstyrene copolymers were added was the same as the master batch formulation to which the bromobutyl rubber was added. Different curing agents were used in Formulations G through J than in Formulation K. The curing agents in Formulations G through J were the same as for Formulations A through E and the agents for Formulation K were the same as for Formulation F. The Formulations in accordance with the present invention are designated G through J. The comparative formulation containing bromobutyl rubber was designated K. The bromobutyl used in Formulation K comprised 2.0 weight percent bromine and had a Mooney viscosity of 51.4 (ML 1+8) at 100° C. (i.e., Exxon Bromobutyl Grade 2244, Exxon Chemical Company).

The bromobutyl rubber used in Formulation K is designated "Copolymer AA" in Table II. The bromoisobutylene para-methylstyrene copolymer used in Formulations G through J are designated copolymers AB, AC, AD and AE in Table II. These latter copolymers had different bromine contents and other properties as listed in Table II. All the compounds were cured for 20 minutes at 160° C. in a steam heated compression mold.

The formulations and results of these tests are shown in Table II.

The Mooney viscosities in Table II were all measured in accordance with ASTM D1646.

| FORMULATIONS | G | H | I | J | K |
|---|---|---|---|---|---|
| Copolymer AB | 100.0 | | | | |
| Copolymer AC | | 100.0 | | | |
| Copolymer AD | | | 100.0 | | |
| Copolymer AE | | | | 100.0 | |
| Copolymer AA | | | | | 100.0 |
| Carbon Black (1) | 40.0 | 40.0 | 40.0 | 40.0 | 40.00 |
| Plasticizer (2) | 15.0 | 15.0 | 15.0 | 15.0 | 15.0 |
| Stearic Acid | 2.0 | 2.0 | 2.0 | 2.0 | 1.0 |
| Antioxidant | 1.5 | 1.5 | 1.5 | 1.5 | 5.0 |
| DPTHS (Tetrone A) | 1.0 | 1.0 | 1.0 | 1.0 | |
| TMTDS | | | | | 1.0 |
| MBTS | | | | | 2.0 |
| Formula Weight | 159.5 | 159.5 | 159.5 | 159.5 | 165.0 |
| Mooney Scorch (MS) 132 C Minutes to 3 Point Rise | 8.6 | 8.8 | 6.2 | 4.9 | 7.5 |
| Mooney Viscosity (ML) 100 C 1 + 8 Minute Reading | 52.0 | 41.0 | 38.2 | 34.2 | 51.4 |
| Rheometer 160 C ML | 11.55 | 7.80 | 7.00 | 6.50 | 12.45 |
| 30 Min. Motor, 1.7 Hz MH | 37.25 | 33.00 | 45.20 | 54.00 | 29.10 |
| 3 Degree Arc TS2 | 2.22 | 2.26 | 1.51 | 1.20 | 1.95 |
| 50 Full Scale 1,2,4 T'90 | 8.25 | 8.30 | 5.90 | 5.68 | 4.79 |
| 100 Full Scale 3,5-8 MH-ML | 25.70 | 25.20 | 38.20 | 47.50 | 16.65 |
| Original Physical Properties Press Cure 20 Minutes at 160° C. | | | | | |
| Hardness, Shore A | 46 | 46 | 54 | 55 | 49 |
| 100% Modulus, MPa | 0.83 | 0.83 | 1.38 | 1.97 | 0.77 |
| 300% Modulus, MPa | 3.71 | 3.60 | 6.62 | 9.55 | 2.96 |
| Tensile Strength, MPa | 15.68 | 13.62 | 12.81 | 10.67 | 15.66 |
| Elongation, % | 805 | 782 | 540 | 336 | 880 |
| COMPOUND PROPERTIES | | | | | |
| Tear Strength, Die C At 25° C., kN/M | 41.22 | 37.48 | 37.42 | 28.12 | 40.04 |
| Air Permeability at 66 C | | | | | |
| Sample A. Q × 10 3 | 2.31 | 2.34 | 2.18 | 2.14 | 2.24* |

-continued

| | | | | | |
|---|---|---|---|---|---|
| Sample B, Q × 10 3 | 2.27 | 2.29 | 2.15 | 2.31 | 2.28 |
| Average | 2.29 | 2.32 | 2.17 | 2.23 | 2.26 |
| Air Oven Aging 96 Hours at 150 C | | | | | |
| Hardness, Shore A | 50 | 51 | 60 | 65 | 57** |
| 100% Modulus, MPa | 0.89 | 0.93 | 1.84 | 3.15 | 1.35 |
| 300% Modulus, MPa | 3.66 | 3.68 | 8.74 | | 4.81 |
| Tensile Strength, MPa | 12.55 | 11.24 | 11.72 | 10.83 | 9.00 |
| Elongation, % | 752 | 711 | 383 | 230 | 579 |
| Hardness Change, Pts. | 4 | 5 | 6 | 10 | 8 |
| Tensile Retained, % | 80 | 83 | 91 | 101 | 57 |
| Elongation Retained, % | 93 | 91 | 71 | 68 | 66 |

| POLYMER CHARACTERISTICS | % PMS | % Br | MOONEY VISCOSITY |
|---|---|---|---|
| Copolymer AB | 5.00 | 0.85 | 48.0 |
| Copolymer AC | 5.00 | 0.85 | 34.0 |
| Copolymer AD | 10.00 | 1.40 | 31.0 |
| Copolymer AE | 15.00 | 2.00 | 27.0 |

*Data based on Resin Cured Exxon Butyl 268 in the same compound formulation.
**Bromobutyl compound aged 70 hours at 150 C.
(1) Carbon Black ASTM N330
(2) Sunpar 2280, Paraffinic oil, ASTM D2226 Type 104B Table III shows the results of a omparison of a brominated isobutylene para-methylstyrene copolymer with Chlorobutyl in typical steam hose compositions. The data shows that compounds based on the brominated isobutylene para-methylstyrene copolymer have better scorch safety (high TS2), faster cure (lower T90), significantly lower compression set and significantly better retention of hardness, tensile strength and elongation after aging in steam and hot air.

The brominated isobutylene para-methyl styrene copolymer (Designated copolymer AF) contained 5 wt % paramethylstyrene and 0.7 mole % bromine. The chlorobutyl rubber, copolymer AG contained about 1.1 weight % chlorine.

TABLE III

STEAM HOSES
FORMULATIONS

| | TUBE | | COVER | |
|---|---|---|---|---|
| | AG | AH | AI | AJ |
| Copolymer AG | 100 | — | 100 | — |
| Copolymer AF | — | 100 | — | 100 |
| Amorphous Silica | 20 | — | — | — |
| Carbon Black (1) | 60 | 45 | 30 | 25 |
| Carbon Black (2) | — | — | 30 | — |
| Carbon Black (3) | — | — | — | 35 |
| Plasticizer (4) | 10 | — | — | — |
| Plasticizer (5) | — | — | 5 | — |
| Plasticizer (6) | — | 10 | — | 5 |
| STEARIC ACID | 1 | 1 | 1 | 1 |
| A.O. 2246 (7) | 1 | — | 1 | — |
| PHEN. FORM RESIN | — | — | 3 | — |
| ESCOREZ 1102 (8) | 3 | — | — | — |
| Magnesium Oxide | — | — | 2 | — |
| ZnO | 3 | 2 | 3 | 2 |
| TMTDS | 2 | — | 1 | 1 |
| SULPHUR | — | 1 | — | 1 |
| Vulcanizer (9) | — | 3 | — | 3 |
| MBTS | 1 | 2 | 2 | 2 |

STEAM HOSES BASED ON BR-XP-50 RESULTS

1° RHEOMETER MONSANTO ODR 2000E (180° C./3° ARC)

| | | | | |
|---|---|---|---|---|
| ML (minimum) | 7.5 | 5.8 | Not Available | 9.8 |
| MH (maximum) | +24 | 45 | | 72 |
| TS2 (minimum) | 2.35 | 2.6 | | 1.3 |
| T50 (minimum) | 8.3 | 4.6 | | 2.2 |
| T90 (minimum) | +24 | 7.6 | | 4.3 |

TABLE III-continued

STEAM HOSES
STEAM HOSES BASED ON BR-XP-50 RESULTS

| | TUBE | | ORIGINAL COVER | |
|---|---|---|---|---|
| | REF. 1 (317) | EXP. 1 (314) | REF. 1 | EXP. 2 (316) |
| 2° PHYSICAL PROPERTIES | | | | |
| Shore A° | 47 | 45 | 68 | 64 |
| M100 (MPa) | 1.3 | 1.2 | — | 2.2 |
| M300 (MPa) | 4.7 | 5 | 9.3 | 9 |
| TENS. STR. (MPa) | 6.6 | 11 | 13.2 | 13.4 |
| ELONGATION (%) | 435 | 640 | 500 | 470 |
| AIR AGED 150° C./14 DAYS | | | | |
| SHORE A. | 64 | 49 | 80 | 70 |
| M100 (MPa) | 2.2 | 2 | — | 3.8 |
| M300 (MPa) | — | 7 | — | — |
| TENS. STR. (MPa) | 2.8 | 9.2 | 6.9 | 9.2 |
| ELONGATION (%) | 176 | 445 | 120 | 230 |
| STEAM AGED 180° C./5 DAYS | | | | |
| SHORE A. | 43 | 38 | Not Available | 54 |
| M100 (MPa) | 1.2 | 1.25 | Not Available | 2.3 |
| M300 (MPA) | — | 6 | Not Available | 9.5 |
| TENS. STR. (MPa) | 4 | 8.5 | Not Available | 9.8 |
| ELONGATION (%) | 176 | 408 | Not Available | 301 |
| 3° COMPRESSION SET (B) (22 hRS./70° C.) | 43 | 16.5 | Not Available | 15 |

(1) Carbon black, ASTM N550
(2) Carbon black, ASTM N330
(3) Carbon black, ASTM N339
(4) Naphthenic petroleum oil, ASTM type 104A
(5) Paraffinic rubber frozen oil, ASTM type 104B
(6) Paraffinic rubber frozen oil, ASTM type 104B
(7) 2.2'-methylene-bis(4-methyl-6-t-butylphenol)
(8) Aliphatic hydrocarbon tackifying resin, manufactured by Exxon Chemical Co.
(9) Alkyl phenol-formaldehyde resin The Mooney viscosities in Table II were all measured in accordance with ASTM D1646.

What is claimed is:

1. A vulcanized elastomeric hose comprising an inner tube and an outer cover, wherein said inner tube or said outer cover comprises a composition consisting essentially of:
    (1) a halogen-containing copolymer of a $C_4$ to $C_7$ isomonoolefin and a para-alkylstyrene, said copolymer comprising at least about 5 weight percent of said para-alkylstyrene, and at least about 0.4 mole percent of said halogen; and
    (2) a component selected from the group comprising a filler, a rubber compounding additive, and mixtures thereof.

2. The vulcanized elastomeric hose of claim 1, wherein said composition comprises from about 35 to about 65 weight percent of said copolymer; and from about 35 to about 65 weight percent of said component (2).

3. The vulcanized elastomeric hose of claim 1, wherein said copolymer comprises from about 5 to 20 weight percent of said para-alkylstyrene.

4. The vulcanized elastomeric hose of claim 1, wherein said copolymer comprises at least about 0.5 mole percent of said halogen.

5. The vulcanized elastomeric hose of claim 1, wherein said halogen is selected from the group consisting of chlorine, bromine, and mixtures thereof.

6. The vulcanized elastomeric hose of claim 1, wherein said halogen comprises bromine, and wherein said bromine is chemically bound to said para-alkylstyrene.

7. The vulcanized elastomeric hose of claim 1, wherein said isomonoolefin is isobutylene and said para-alkylstyrene is para-methylstyrene.

8. The vulcanized elastomeric hose of claim 1, wherein said component (2) is a filler, and wherein said filler is selected from the group consisting of carbon black, calcium carbonate, clay, silica, and mixtures thereof.

9. The vulcanized elastomeric hose of claim 1, wherein said component (2) is a rubber compounding additive and wherein said rubber compounding additive is selected from the group consisting of antioxidants, stabilizers, rubber processing oils, pigments, and mixtures thereof.

10. The vulcanized elastomeric hose of claim 9, wherein said rubber compounding additive is selected from the group consisting of stearic acid, low molecular weight polyethylene, waxes, and mixtures thereof.

11. The vulcanized elastomeric hose of claim 1, wherein said hose is an automotive radiator coolant hose.

12. The vulcanized elastomeric hose of claim 1, wherein said inner tube comprises said composition.

13. The vulcanized elastomeric hose of claim 1, wherein said outer cover comprises said composition.

* * * * *